(12) United States Patent
Mabuchi

(10) Patent No.: US 7,564,016 B2
(45) Date of Patent: *Jul. 21, 2009

(54) SOLID-STATE IMAGING DEVICE AND METHOD FOR DRIVING THE SAME

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 11/207,311

(22) Filed: Aug. 19, 2005

(65) Prior Publication Data

US 2006/0007334 A1    Jan. 12, 2006

Related U.S. Application Data

(63) Continuation of application No. 10/473,665, filed as application No. PCT/JP03/00375 on Jan. 17, 2003, now Pat. No. 6,940,059.

(30) Foreign Application Priority Data

Jan. 17, 2002    (JP)    ............................. 2002-008944

(51) Int. Cl.
*H01L 27/00*    (2006.01)
(52) U.S. Cl. .................................. 250/208.1
(58) Field of Classification Search ............... 250/208.1
See application file for complete search history.

(56) References Cited

U.S. PATENT DOCUMENTS 6,037,577 A    3/2000    Tanaka et al.
6,230,616 B1    5/2001    Steuer

FOREIGN PATENT DOCUMENTS

JP    2000-050174    2/2000
JP    2001-186414    7/2001
WO    WO 97/17800    5/1997

*Primary Examiner*—Seung C Sohn
(74) *Attorney, Agent, or Firm*—Robert J. Depke; Rockey, Depke & Lyons, LLC.

(57) ABSTRACT

A shutter row and a selecting row in an image pixel portion 104 are sequentially shifted by vertically (V) selecting means 106. Then, in pixels constituting the shutter row, signal charges of photoelectric conversion elements (photodiodes) are transferred to FD portions after the reset of the FD portions. Subsequently, in the pixels constituting the selecting row, signal charges of the photoelectric conversion elements are transferred to the FD portions before the reset of the FD portions. As a result, it is possible to output a signal having a knee point which is sensitive in the dark and insensitive in the light, thereby enabling an image with wider dynamic range to be picked up with a simple construction having a single output system, even if the amount of saturated electric charges of the photoelectric conversion elements is small.

9 Claims, 10 Drawing Sheets

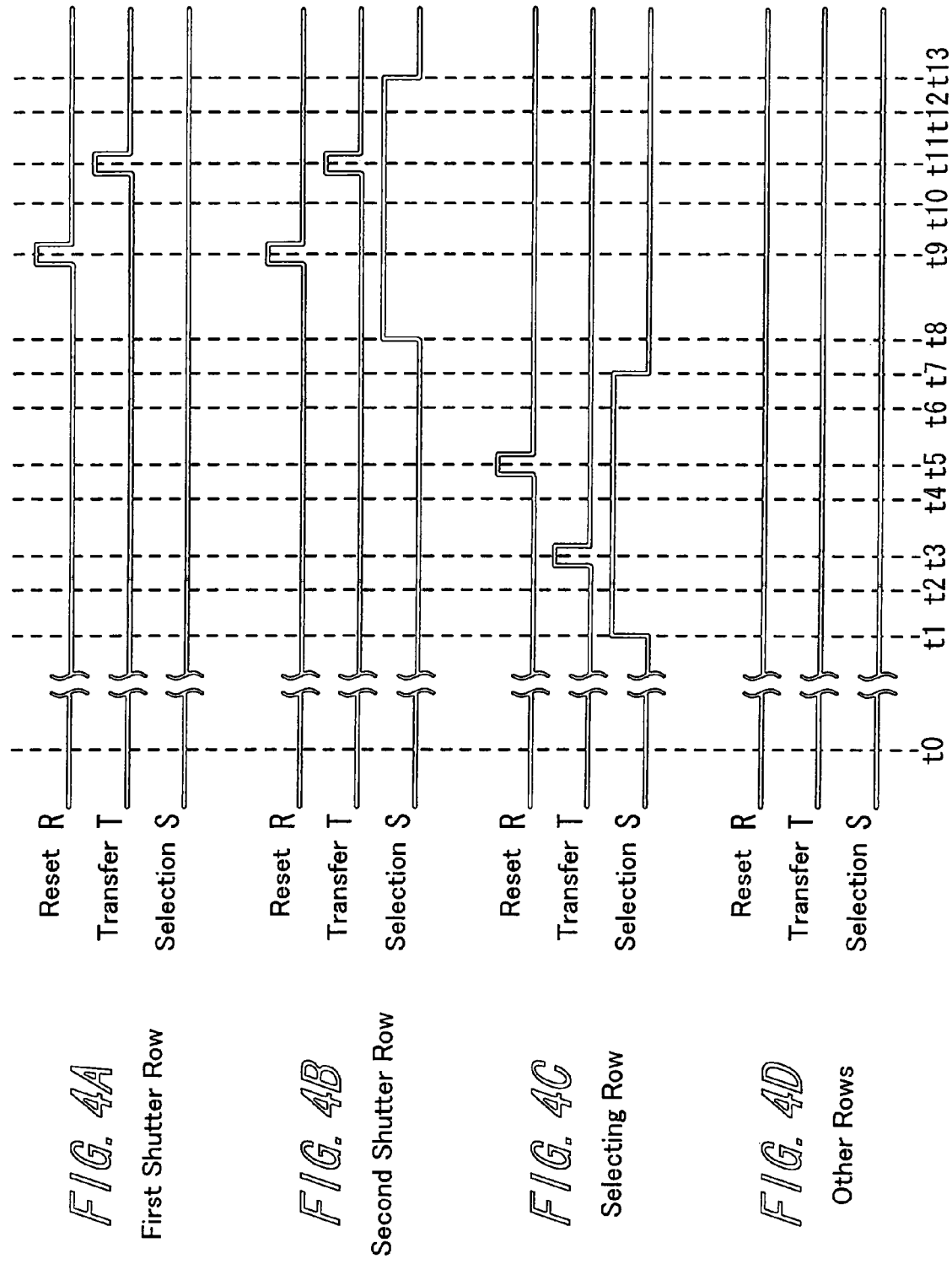

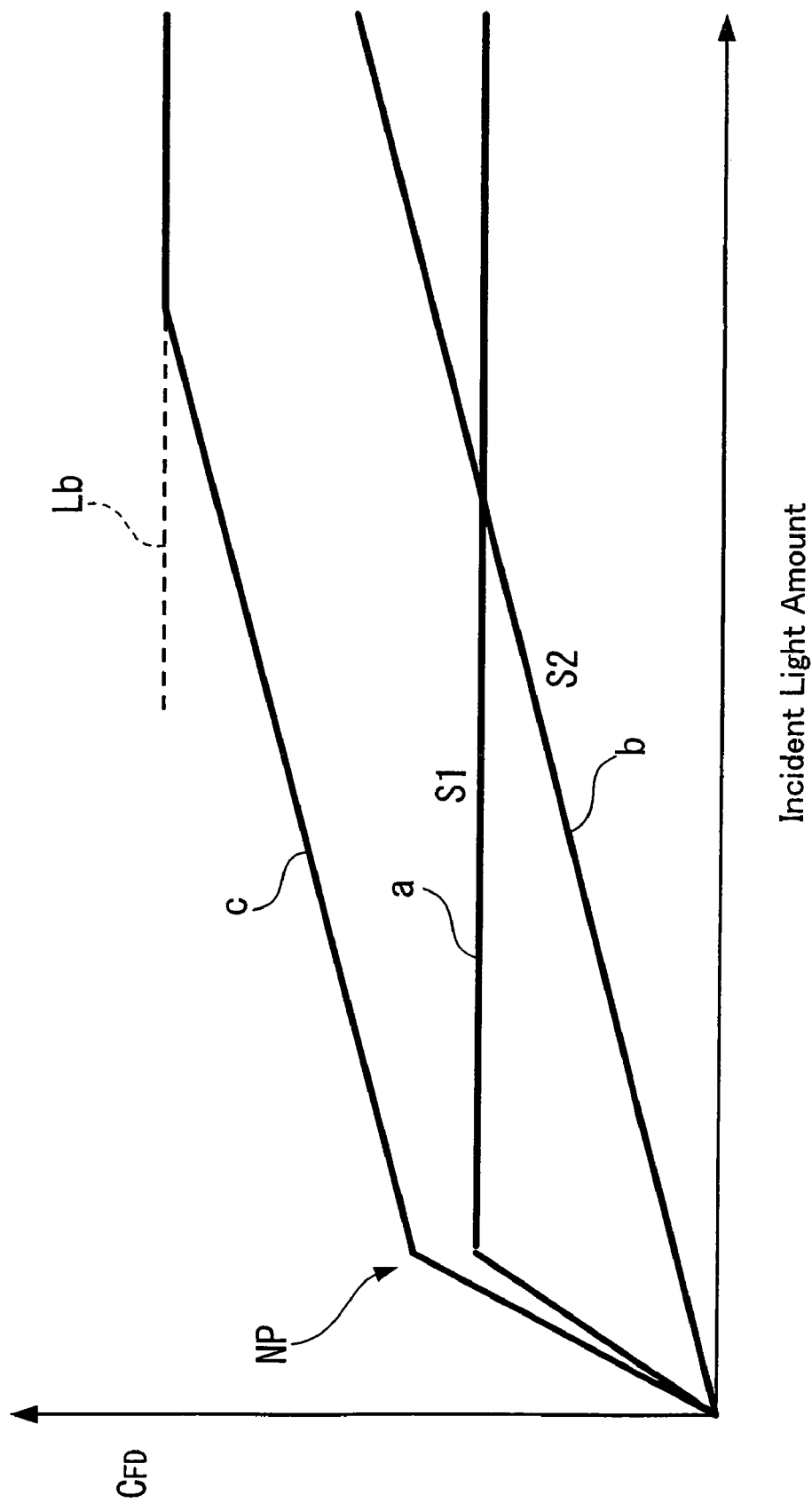

SOLID-STATE IMAGING DEVICE AND METHOD FOR DRIVING THE SAME

The subject matter of application Ser. No. 10/473,665 is incorporated herein by reference. The present application is a continuation of U.S. application Ser. No. 10/473,665, filed Mar. 8, 2004 now U.S. Pat. No. 6,940,059, which claims priority to Japanese Patent Application No. JP2002-008944, filed Jan. 17, 2002, and WIPO Application No: PCT/JP03/00375, filed Jan. 17, 2003. The present application claims priority to these previously filed applications.

TECHNICAL FIELD

The present invention relates to a solid-state imaging device especially applied to a CMOS type image sensor, and a method for driving the same.

BACKGROUND ART

In a CMOS type image sensor, an image pixel portion is constructed by disposing a number of pixels on a semiconductor chip in a two-dimensional matrix manner; and each pixel includes a photoelectric conversion element such as a photodiode or the like, which generates signal charges in response to the amount of received light, and a gate circuit composed of a plurality of MOS transistors for converting the signal charges generated by those photoelectric conversion elements into electrical signals to be read at a predetermined timing. Also, in the vicinity of the image pixel portion there are provided: a signal processing circuit which performs signal processing such as CDS (Correlated Double Sampling) or the like with respect to a signal from each pixel, a vertical/horizontal scanner circuit for driving a gate circuit of each pixel to read signals of each pixel in a predetermined order, and a shutter scanner circuit for clicking the electronic shutter.

In a conventional CMOS type image sensor, as pixel arrangement of an image pixel portion 10 is schematically shown in FIG. 11, a number of pixels 12 are disposed in the image pixel portion 10 in a two-dimensional matrix manner, and an electronic shutter row 14 which resets a signal charge of each pixel 12 and a read selecting row 16 which reads a pixel signal are selected at an interval of a predetermined number of rows in between and then sequentially shifted in the direction indicated by the arrow A.

At each pixel 12 in the electronic shutter row 14, an operation of discarding photoelectrons (charge) accumulated in a photodiode of each pixel 12 is performed.

Also, at each pixel 12 in the read selecting row 16, an operation of converting photoelectrons accumulated in a photodiode of each pixel 12 into an electrical signal to be output to a signal processing circuit through an output signal line is performed.

Accordingly, the output signal of each pixel 12 becomes a signal whose level corresponds to the amount of photoelectrons accumulated in the photodiode between the times when each pixel 12 is reset in the electronic shutter row 14 and that is selected for being read in the read selecting row 16.

Consequently, sensitivity can be adjusted by changing the interval between the electronic shutter row 14 and the read selecting row 16 to alter a period of time in which photoelectrons are accumulated.

Conventional electronic shutters function as described above.

However, in the above-mentioned method, when a bright part and a dark part coexist in an image to be picked up, there is a problem in which sensitivity is not sufficient at the dark part if the shutter time is adjusted corresponding to that for the bright part, and a photodiode at the bright part gets saturated and completely whitened if the shutter time is adjusted corresponding to the dark part, namely a problem of narrow dynamic range has been noted.

Accordingly, as a method for widening the dynamic range there has recently been proposed, for example, the method disclosed in Japanese laid-open patent publication No. 2001-177775.

In the above method a signal of a photodiode is read in a plurality of divided times in an image-signal readout selecting row.

However, in this method, due to the miniaturization of image pickup devices and decrease in the number of saturated electrons in a photodiode caused by employing lower voltages in recent years, one transfer can never satisfy electric potential sufficient in a floating diffusion (hereinafter called FD) portion, so that signals can not sufficiently be obtained after the first time even if the reading is carried out a plurality of times; therefore it is impossible to increase dynamic range in this case.

Also, in this case, since the reading has to be consecutively executed twice or more in one selected row, it is difficult to speed up the shifting of pixel rows.

Also, in order to remove fixed-pattern noise of each pixel, if CDS processing which takes the difference between signal levels at the time of a reset and at the time of photoelectrons being accumulated is executed, it is necessary to perform the resetting operation twice and to perform the operation of accumulating photoelectrons twice for reading two pixel signals in one selected row, so that reset level detection and photoelectron accumulation level detection have to be executed four times in total.

Also, since the above-described method is of combining a plurality of pixel signals that have been read in a plurality of divided times, circuits for the combination is required at a subsequent stage, thereby causing problems in which circuits are made to be large in size, and there occurs dispersion in combined portions and among circuits for the combination, each of which is provided in each pixel row.

DISCLOSURE OF INVENTION

The present invention is to provide a solid-state imaging device capable of improving dynamic range, and a method for driving the same, without causing larger and complicated circuits to be employed.

A solid-state imaging device according to the present invention includes an image pixel portion in which a plurality of pixels are arranged in a matrix manner, vertically selecting means by which each pixel row in a horizontal direction is selected in the vertical direction in the image pixel portion, pixel drive means which drives each pixel in the pixel row selected by the vertically selecting means through pixel drive wiring, and signal processing means which inputs signals of each pixel through an output signal line and executes predetermined signal processing.

Each pixel in the image pixel portion includes: a photoelectric conversion element; transfer means which transfers a signal charge accumulated by the photoelectric conversion element after performing photoelectric conversion to a floating diffusion portion; reset means which resets the electric potential of the floating diffusion portion; and amplifying means which outputs output signals corresponding to the electric potential of the floating diffusion portion.

The vertically selecting means has the functions of selecting at least two pixel rows in the image pixel portion as a shutter row and a selecting row, and shifting the rows sequentially; and the pixel drive means has the functions of, in the shutter row selected by the vertically selecting means, performing the operation of transferring a signal charge of the photoelectric conversion element to the floating diffusion portion after the reset of the floating diffusion portion and, in the selecting row selected by the vertically selecting means, performing the operation of transferring a signal charge of a photoelectric conversion element to a floating diffusion portion without resetting the floating diffusion portion or before resetting the floating diffusion portion, and outputting transferred output signals to the above-described signal processing means.

Further, a method for driving the solid-state imaging device according to the present invention includes: an image pixel portion in which a plurality of pixels are arranged in a matrix manner, vertically selecting means by which each pixel row in a horizontal direction is selected in the vertical direction in the image pixel portion, pixel drive means which drives each pixel in the pixel row selected by the vertically selecting means through pixel drive wiring, and a signal processing means which inputs signals of each pixel through an output signal line and executes predetermined signal processing, wherein each pixel in the image pixel portion includes: a photoelectric conversion element; transfer means which transfers a signal charge accumulated by the photoelectric conversion element after performing photoelectric conversion, to a floating diffusion portion; a reset means which resets the electric potential of the floating diffusion portion; and an amplifying means which outputs output signals corresponding to the electric potential of the floating diffusion portion.

Further, the present invention is the method for driving the solid-state imaging device: in which the vertically selecting means performs the operation of selecting at least two pixel rows in the image pixel portion as a shutter row and a selecting row and shifting them sequentially, and the pixel drive means, in the shutter row selected by the vertically selecting means, performs the operation of transferring a signal charge of the photoelectric conversion element to the floating diffusion portion after the reset of the floating diffusion portion, and, in the selecting row selected by the vertically selecting means, performs the operation of transferring a signal charge of the photoelectric conversion element to the floating diffusion portion without resetting the floating diffusion portion or before resetting the floating diffusion portion, and outputs transferred output signals to the above-described signal processing means.

As described above, since the shutter row and the selecting row are sequentially shifted by the vertically selecting means, and in the shutter row a signal charge of the photoelectric conversion element is transferred to the floating diffusion portion after the reset of the floating diffusion portion, whereas in the selecting row a signal charge of the photoelectric conversion element is transferred to the floating diffusion portion at least before the reset of the floating diffusion portion, it is possible to output a signal having a knee point which is sensitive in the dark and insensitive in the light.

Accordingly, even if the amount of saturated electric charges of the photoelectric conversion element is small, it is possible to obtain wider dynamic range and also to pick up images favorably in a wide dynamic range with a simple construction having a single output system.

Similarly, with respect to the method for driving the solid-state imaging device, since a shutter row and a selecting row are sequentially shifted by the vertically selecting means, and in the shutter row a signal charge of the photoelectric conversion element is transferred to the floating diffusion portion after the reset of the floating diffusion portion, whereas in the selecting row a signal charge of the photoelectric conversion element is transferred to the floating diffusion portion at least before the reset of the floating diffusion portion; it is possible to output a signal having a knee point which is sensitive in the dark and insensitive in the light.

Thus, even if the amount of saturated electric charge of photoelectric conversion element is small, it is possible to obtain wider dynamic range, and also to pick up images favorably in a wide dynamic range with a simple construction having a single output system.

BRIEF DESCRIPTION OF DRAWINGS

FIGS. 4A to 4D are timing charts showing the operations concerning the pixel shown in FIG. 2;

FIG. 6 is an explanatory diagram showing output characteristics of another example of a device according to the present invention.

BEST MODE FOR CARRYING OUT THE INVENTION

Figure 1:
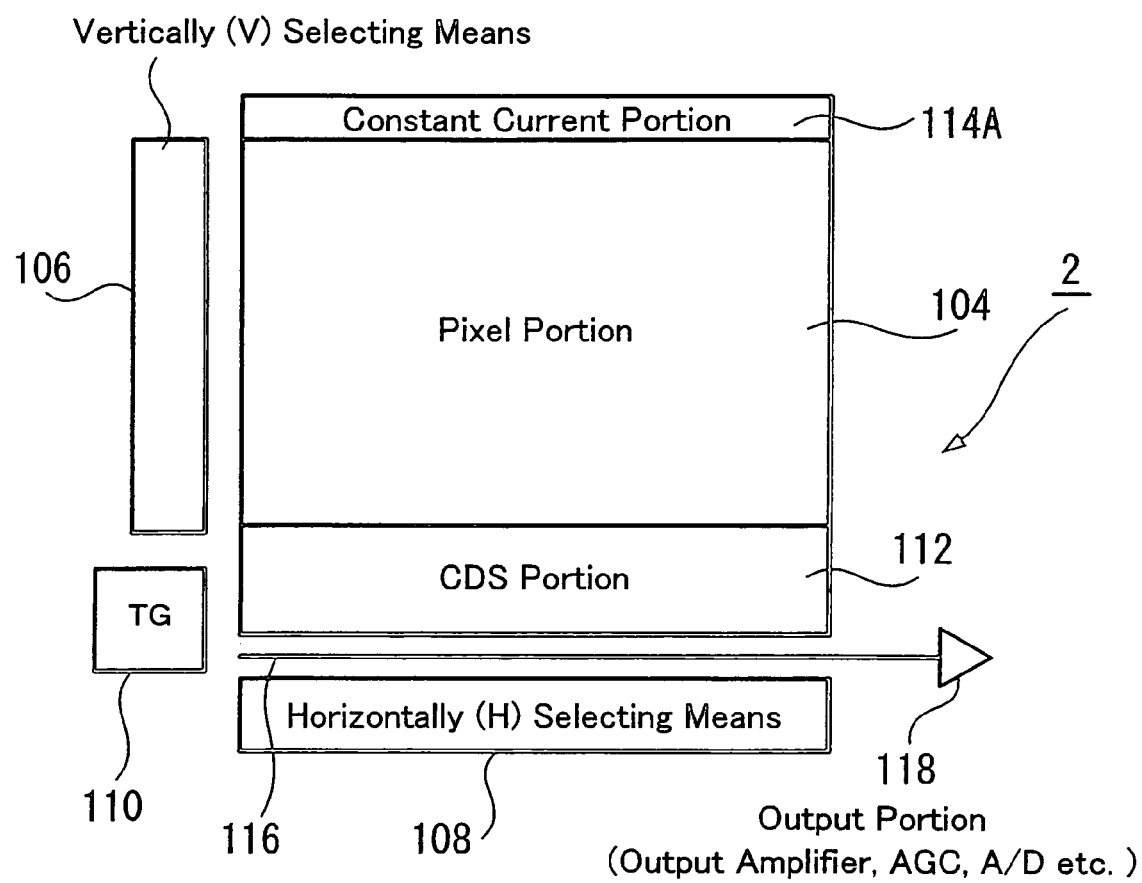
FIG. 1 is an overall constitutional diagram of an example of a solid-state imaging device according to the present invention.

The object of the present invention is to enable obtaining images with wider dynamic range; the applicant of the present invention has previously proposed solid-state imaging devices which can favorably pick up images with a wide dynamic range without fail, flexibly corresponding to various conditions, and methods for driving those devices (refer to, for example, Japanese patent application No. 2001-201601, Japanese patent application No. 2001-276529, and Japanese patent application No. 2001-286457; these are hereinafter called prior applications).

However, solid-state imaging devices according to the above applications each have two output systems, so that circuits unavoidably become large in size.

A further object of the present invention is to provide a solid-state imaging device which can favorably pick up images of a wide dynamic range with a simple construction having a single output system, and a method for driving the same.

A solid-state imaging device according to the present invention includes: a pixel portion in which a plurality of pixels are arranged in a matrix manner, vertically selecting means which sequentially selects signals from the pixels, and signal processing means which performs predetermined signal processing on signals from the pixels.

The pixel portion includes: photoelectric conversion elements which convert light signals into electrical signals, transfer means which transfer the signals from the photoelectric conversion elements to floating diffusion portions, reset means which reset the electric potential of the floating diffusion portions, and amplifying means which amplify signals corresponding to the electric potentials of the floating diffusion portions. Then, in the signal processing means shutter operation without signal processing and selecting operation with signal processing are executed; on the shutter operation, signals accumulated in the photoelectric conversion element are transferred to the floating diffusion portion after the electric potential of the floating diffusion portion is selected to be the reference potential, and on the selecting operation after the shutter operation is executed, signals accumulated in the photoelectric conversion element are transferred to the floating diffusion portion without or before the electric potential of the floating diffusion portion being selected to be the reference potential.

Hereinafter, embodiments of the present invention will be illustrated; it is noted that the following are suitable specific examples, and though various technically desirable restrictions are imposed in explanations, the range of the present invention is not limited to the embodiments in the following explanations unless there is any mention particularly restricting the present invention.

In this embodiment, in a shutter row driving is executed in order of FD reset ' charge transfer, and in a selecting row driving is executed in order of charge transfer ' CDS uptake ' FD reset ' CDS uptake, so that widening dynamic range is achieved by a single output system having a so-called knee point which is sensitive in the dark and insensitive in the light.

According to the above construction, there is no need to prepare two sets of CDS circuits, and it is possible to employ a technique for the knee point output which has been known.

Specifically, a solid-state imaging device according to this embodiment is, as shown in FIG. 1 which is an overall constitutional diagram of a solid-state imaging device 2, a CMOS type image sensor including on a semiconductor substrate (not shown in the figure) an image pixel portion 104, vertically (V) selecting means 106, horizontally (H) selecting means 108, a timing generator (TG) 110, a S/H·CDS portion 112, a constant current portion 114A and the like.

A number of pixels are arranged in a matrix manner in the image pixel portion 104, and an electrical signal generated by each pixel upon detecting light is sequentially selected by the V selecting means 106 and the H selecting means 108 based on a timing pulse provided from the timing generator 110 and is output from an output portion 118a through horizontal signal line 116.

Figure 2:
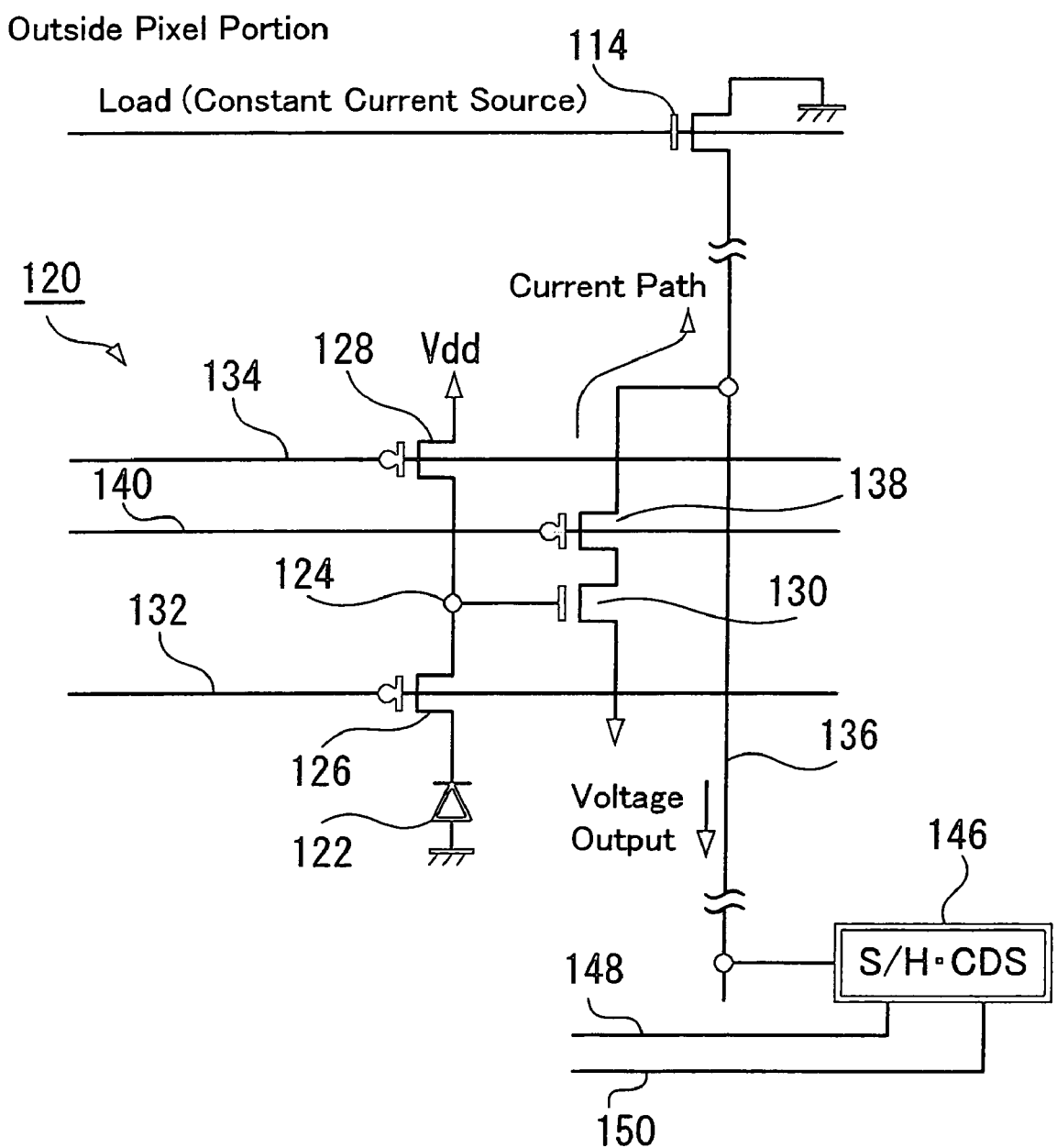
FIG. 2 is a circuit diagram showing the periphery of a pixel of an example of a solid-state imaging device according to the present invention.

As shown in FIG. 2 which is a circuit diagram showing the periphery of one pixel, a pixel 120 constituting the image pixel portion 104 includes: a photodiode 122 as a photoelectric conversion element, an FD portion (floating diffusion portion) 124 for obtaining a potential fluctuation in response to the amount of transferred charges, a transfer gate 126 which connects the photodiode 122 to the FD portion 124 when a transfer pulse is supplied, a reset gate 128 which connects the FD portion 124 to a power supply Vdd when a reset pulse is supplied, and an amplifying transistor 130 which outputs a voltage in response to the potential fluctuation of the FD portion 124.

With respect to the photodiode 122, the anode is connected to the ground and the cathode is connected to the source of an N-type MOSFET (insulated gate field effect transistor) which constitutes the transfer gate 126. Also, the drain of the MOSFET is connected to the FD portion 124, and the gate is supplied with a transfer pulse 132 from the V selecting means 106. The reset gate 128 is also composed of the N-type MOSFET, whose source is connected to the FD portion 124 and whose drain is connected to the power supply Vdd, respectively, and the gate is supplied with a reset pulse 134 from the V selecting means 106.

The gate of the N-type MOSFET constituting the amplifying transistor 130 is connected to the FD portion 124, and the drain is connected to the power supply Vdd. A selecting transistor 138 composed of the N-type MOSEFT is provided between the amplifying transistor 130 and a vertical signal line 136, and to the gate a selecting pulse 140 is supplied from the V selecting means 106 shown in FIG. 1. Then, the source of the amplifying transistor 130 is connected to the drain of the selecting transistor 138, and the source of the selecting transistor 138 is connected to the vertical signal line 136.

The vertical signal lines 136 are provided in each row of pixels 120 which are arranged in a matrix manner, and all the sources of selecting transistors 138 in pixels 120 belonging to the same row are each connected to corresponding vertical signal lines 136. One end of the vertical signal line 136 is connected to a constant current generator 114 at the constant current portion 114A disposed outside the image pixel portion 104, and a constant current is made to flow into the vertical signal line 136 by the constant current generator 114. The other end of the vertical signal line 136 is connected to the S/H·CDS portion 112 disposed outside the image pixel portion 104 shown in FIG. 1.

In the S/H·CDS portion 112, an S/H·CDS circuit 146 is provided for each vertical signal line 136. To each of the S/H·CDS circuits 146 first and second sampling pulses 148 and 150 are supplied from the timing generator 110 shown in FIG. 1, and based on those sampling pulses, the S/H·CDS circuit 146 maintains the voltage (light-detecting voltage) which is output by the amplifying transistor 130 to the vertical signal line 136 and obtained from the FD portion 124 by a signal charge from the photodiode 122, and the voltage (offset voltage) obtained from the FD portion 124 at the time of the reset; and the S/H·CDS circuit 146 outputs a voltage corresponding to the difference between the two voltages.

It is noted that the first and second sampling pulses 148 and 150 are supplied at the same time when the S/H·CDS circuit 146 is made to maintain the offset voltage, and only the second sampling pulse 150 is supplied when the S/H·CDS circuit 146 is made to maintain the light-detecting voltage.

An output signal of the S/H·CDS circuit 146 provided for each vertical signal line 136 is sequentially selected by the H selecting means 108 shown in FIG. 1, which operates based on a timing signal from the timing generator 110, to be output to the horizontal signal line 116, and then is output through the output portion 118. The output portion 118 is composed of an amplifying circuit, an AGC circuit, an A/D converter and so forth, if described in detail.

Figure 3:
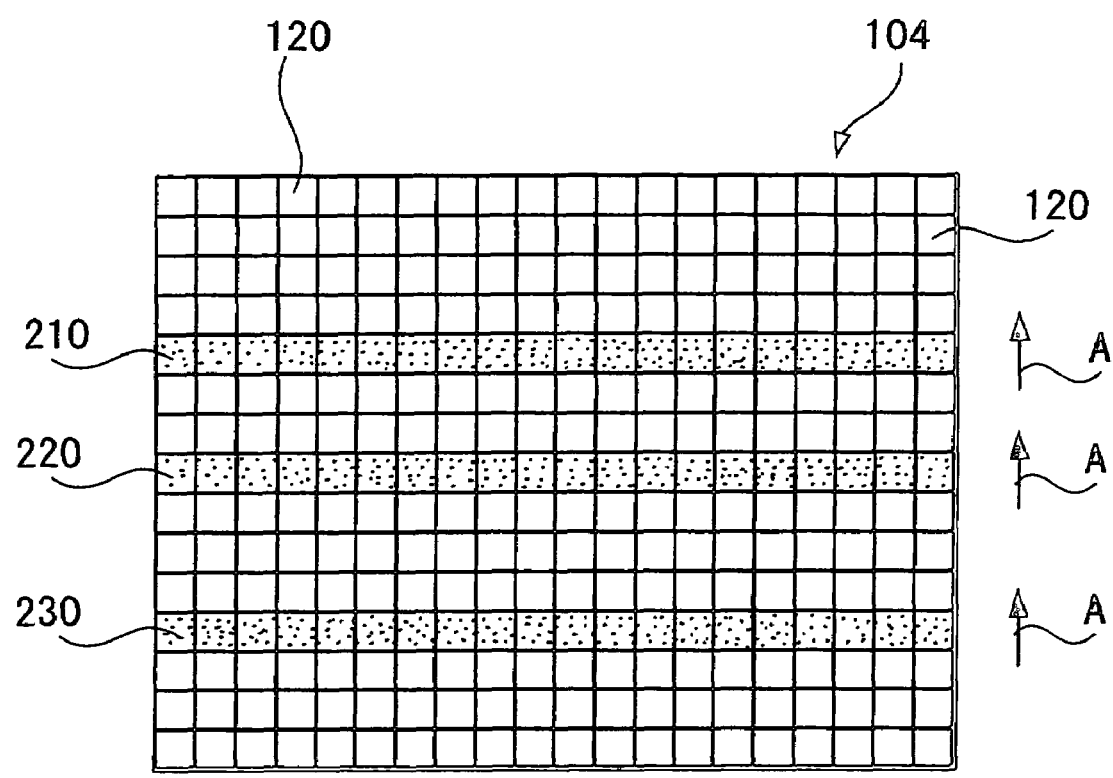
FIG. 3 is a view showing the relationship between electronic shutter rows and a signal readout selecting row of an example of a solid-state imaging device according to the present invention.

In the solid-state imaging device of this embodiment, as shown in FIG. 3 in which the operation of selecting pixel rows is illustrated, a number of pixels 120 are disposed in the image pixel portion 104 in a two-dimensional matrix manner, and first and second shutter rows 210 and 220 which reset a signal charge of each pixel 120 and a selecting row 230 which reads a pixel signal are selected with an interval of a predetermined number of rows in between and then sequentially shifted in the direction indicated by the arrow A.

In each pixel 120 of the first shutter row 210 the resetting operation, in which photoelectrons accumulated in the photodiode 122 of each pixel 120 are discarded, is performed.

It should be noted that although only the photodiode 122 of the photoelectric conversion element is reset in this embodiment, it is also possible to reset the FD portion 124 in addition to the photodiode 122. As a method for resetting the photodiode 122 except when the FD portion 124 is reset, a method in which a voltage is applied to the substrate to make an electric charge of the photodiode 122 drain into the substrate is available. Alternatively, it is also possible to provide a charge drain portion apart from the FD portion 124.

Further, in each pixel 120 of the second shutter row 220 the operation of resetting the FD portion 124 is performed, and afterward, photoelectrons accumulated in the photodiode 122 are transferred to the FD portion 124, whose electric potential has been selected to be the reference potential.

Further, in each pixel 120 of the selecting row 230 photoelectrons accumulated in the photodiode 122 of each pixel 120 are again transferred to the aforementioned FD portion 124 in the state in which electric potential thereof is not selected to be the reference potential or in the state before electric potential thereof is selected to be the reference potential, and the photoelectrons transferred to the FD portion 124 are read out to the vertical signal line 136 by the amplifying transistor 130 and the selecting transistor 138. After that, the FD portion 124 of each pixel 120 is reset with its signal simultaneously read out to the vertical signal line 136.

At this moment, in pixel rows other than the shutter rows 210 and 220 and the selecting row 230 no operation is performed.

Next, the above-described operations are explained referring to FIG. 4.

FIGS. 4A to 4D each show the operations of reset R, transfer T, and selection S with respect to the first shutter row, the second shutter row, the selecting row and other rows, respectively.

In each of FIGS. 4A to 4D, the section in which pixels are driven is chosen from one row period to be shown, and practically t0 that is a period in which pixels are not driven occupies the vast majority of the whole period.

First, when the first shutter row 210 comes to a pixel 120, the FD portion 124 is reset at t9, and photoelectrons in the photodiode 122 are transferred to the FD portion 124 at t11. Therefore, the photodiode 122 once becomes empty at this point; however, photoelectrons start to be accumulated in the photodiode 122 hereafter.

Next, when the second shutter row 220 comes, in the pixel 120 the selecting transistor 138 is turned ON at t8 and the electric potential of the vertical signal line 136 follows the FD potential of the second shutter row 220. Then, the FD portion 124 is reset at t9, and photoelectrons in the photodiode 122 are transferred to the FD portion 124 at t11. Thus, photoelectrons start to be again accumulated in the photodiode 122. Then, the selecting transistor 138 is turned OFF at t13.

Then, when the selecting row 230 comes, the pixel 120 is driven between t1 and t7. In the pixel 120 the selecting transistor 138 is turned ON at t1 and the electric potential of the vertical signal line 136 follows the FD potential of the selecting row 230. Next, photoelectrons in the photodiode 122 are transferred to the FD portion 124 at t3. Then, the FD portion 124 is reset at t5.

The S/H·CDS circuit 146 takes in the electric potential of the vertical signal line 136 at t4 and t6 and maintains the difference between these two electric potentials. Subsequently, the selecting transistor 138 is turned OFF at t7.

The output of the S/H·CDS circuit 146 is read out to the horizontal signal line 116 in order by the H selecting means 108, and then output through the output portion 118.

These operations are characterized by the following aspects:

(1) In the second shutter row 220, the transfer pulse is applied after the reset pulse.

(2) In the selecting row 230, the transfer pulse is applied before the reset pulse.

According to those operations, signal processing can be executed with a single output system, without requiring two outputs systems. Further, wider dynamic range can be obtained even if the amount of saturated signals of photodiodes is small.

Hereinafter, the reason for the above will be explained referring to FIGS. 5 and 6.

FIGS. 5 are a sectional construction view (FIG. 5A) including a photodiode, a transfer gate portion, and a reset gate portion all constituting one pixel; and potential diagrams (FIGS. 5B to 5E) thereof.

Figure 5A:
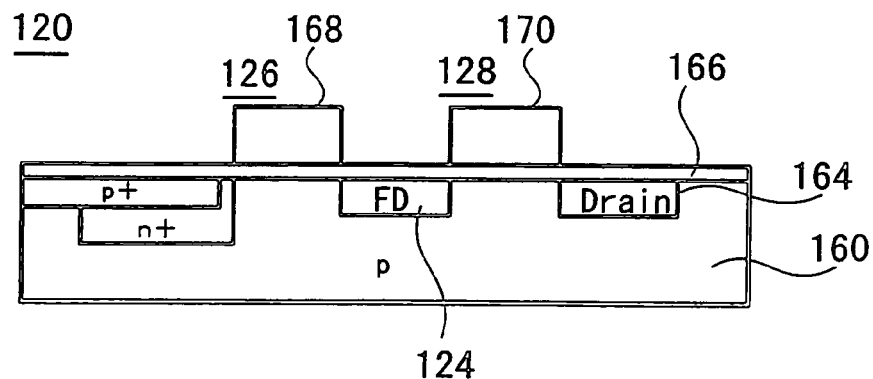
FIGS. 5A to 5E are views showing the transition of the potential between a photodiode and a floating diffusion portion of another example of a solid-state imaging device according to the present invention.
Figure 5B:
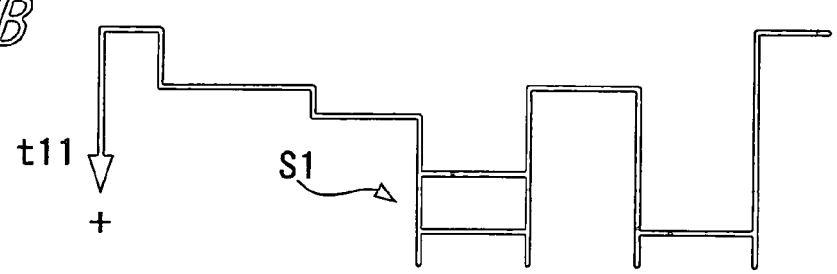
Figure 5C:
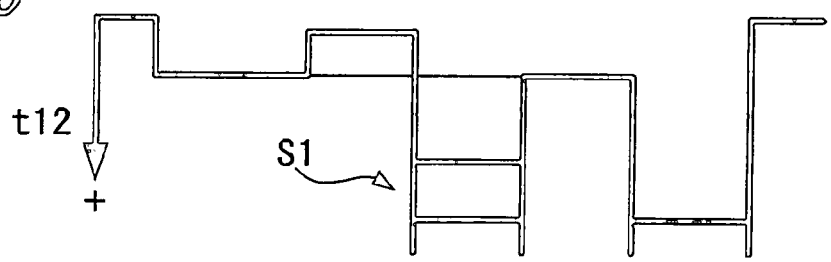

FIG. 5A shows a construction in which the photodiode 122 consisting of a p+ area and an n area, the FD portion 124 and a drain portion 164 are disposed in a Pwell area 162 formed in an Si substrate 160, and a transfer gate electrode 168 and a reset gate electrode 170 are disposed on the Si substrate 160 with a gate insulation film 166 provided in between.

In FIGS. 5B, 5C, 5D and 5E, the horizontal axis shows the positions corresponding to each part shown in FIG. 5A at the respective timings of t11, t12, t2, and t3 shown in FIGS. 4, and the vertical axis shows the potential at each part. With respect to the potential, the downward direction shows +.

Also, FIG. 6 is an explanatory diagram showing output characteristics of the solid-state imaging device, and the vertical axis shows CFD, the amount of electric charges at the FD, and the horizontal axis shows the amount of incident light.

Functions according to the embodiments of the present invention are explained in detail referring to the potential transition diagrams of FIGS. 5B to 5E and the output characteristic diagram of FIG. 6.

Here as an example, the interval between the first shutter row 210 and second shutter row 220 is made 400 rows, and the interval between the second shutter row 220 and the selecting row 230 is made five rows.

First, when the first shutter row 210 comes to a pixel 120, the photodiode 122 is reset, and photoelectrons start to be accumulated at the moment.

Then, when the second shutter row 220 comes to the pixel 120, after resetting the FD portion 124 a signal S1 consisting of 400 rows of photodiodes 122 is transferred to the FD portion 124. Since this signal S1 is accumulated for a long period of time, the signal is sensitive to the amount of light, as shown by a characteristic curve a in FIG. 6; however the signal is saturated in a short period of time at a value decided by the saturation level of the photodiode 122.

Figure 5D:
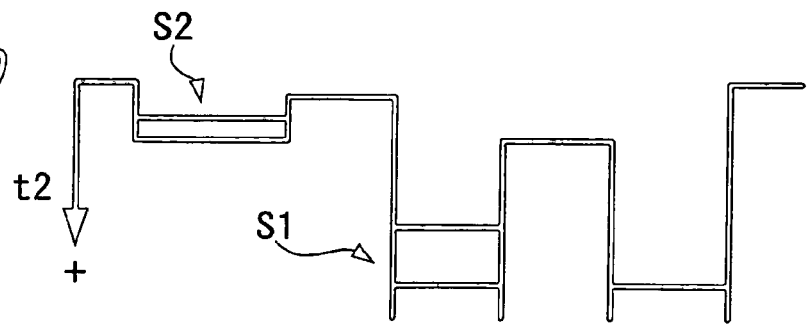
Figure 5E:
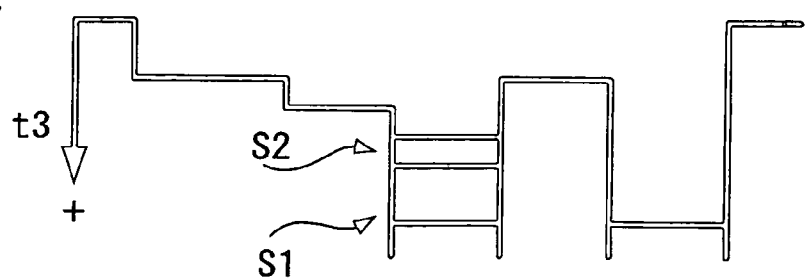

At t12 (in FIG. 5C), the transfer gate is closed and photoelectrons start to be accumulated in the photodiode 122; and when the selecting row 230 comes to the pixel 120, such a potential as a signal S2 of five rows is accumulated in the photodiode 122 as shown by the time point t2 (in FIG. 5D). The signal S2 is transferred to the FD portion 124 at t3 (in FIG. 5E).

Since the signal S2 is accumulated for a short period of time, the signal is 80 times as insensitive to the amount of light as the signal S1 is; and has the relation to the amount of incident light, shown by the curve b in FIG. 6. In this case, when incident light is stronger, since the signal S2 includes the amount which overflows the photodiode 122 and then flows into the FD portion 124, the upper limit thereof is not determined by the saturation of the photodiode 122 different from the case of the signal S1.

Further, the sum of the signals S1 and S2 is accumulated in the FD portion 124 at t3. By reading out the sum, as the electric charge of the FD portion at the time of reading the photoelectrons is shown by the characteristic curve c in FIG. 6, it is possible to obtain a signal whose fluctuation is sudden and large where the amount of light is small and whose fluctuation is small where the amount of light is large. The maximum level Lb of this curve c is decided by the saturation level of the FD portion 124.

Accordingly, it is possible to output a signal having a so-called knee point NP, which shows the characteristic of being sensitive in the dark and insensitive in the light, thereby enabling wider dynamic range to be obtained even if the saturation level of the photodiode 122 is small.

Figure 11:
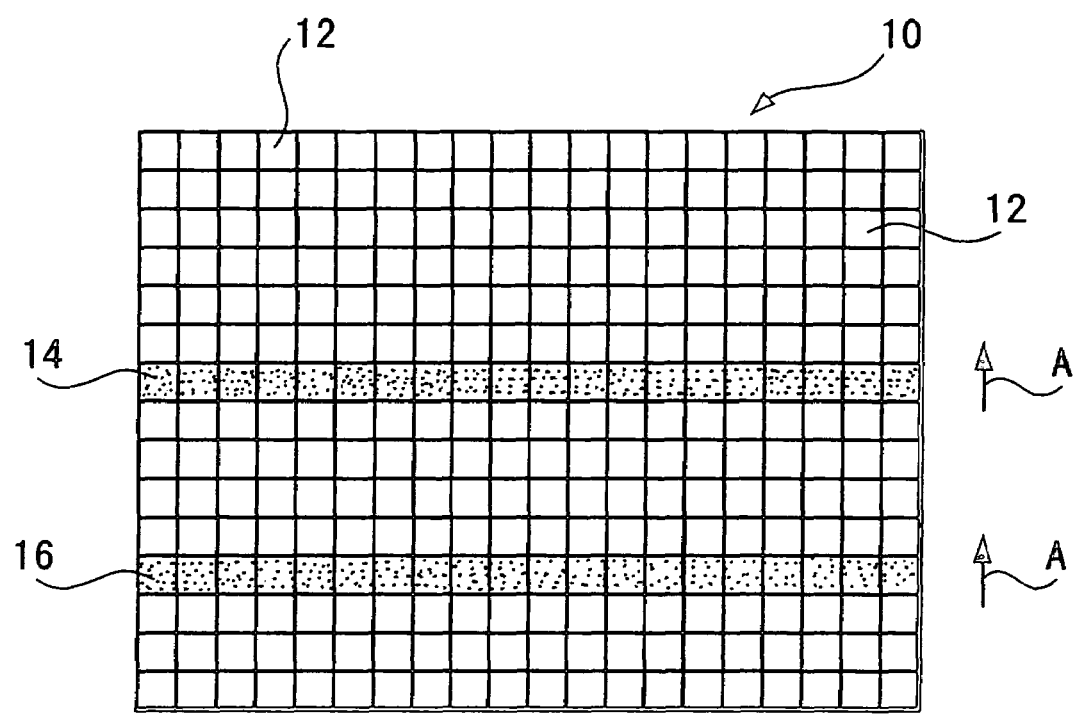
FIG. 11 is an explanatory diagram of the relationship between an electronic shutter row and a read selecting row of a conventional solid-state imaging device.

It should be noted that in the embodiment as described above, the construction in which the first shutter row is not used can be applicable. In this case, the signal S1 is obtained as a light signal of ranging from the previous selecting row to the second shutter row. This appears to be similar to the conventional example of electronic shutter operation shown in FIG. 11; however in the conventional example of electronic shutter operation shown in FIG. 11, after resetting the FD portion in the selecting row, electric charges of photodiodes are transferred to detect the light signals between the electronic shutter row and the selecting row, whereas in this embodiment the sum of the photoelectrons from the previous selecting row to the second shutter row and the light signals between the second shutter row and the selecting row is detected, when the first shutter row is not used in this embodiment, thereby enabling dynamic range to be widened as different to the electronic shutter operation shown in FIG. 11.

Further, with respect to the method for driving, namely the method of applying a drive pulse, various modifications can be made.

For example, in FIG. 4, the first and second shutter rows are driven in the same period of time. In this method, driving time can be shortened, and generating a drive pulse and the design for leading the pulse to each row can be simplified.

However, the first and second shutter rows can be driven in different periods. For example, the driving period of the first shutter row may be shifted from that of the second shutter row, or in the first shutter row a selecting gate may also be open in the driving period.

Moreover, various modes of applying a drive pulse for obtaining the same result as described above can be adopted.

Further, a CDS circuit is used in this example. The circuit is employed for removing fixed-pattern noise due to the dispersion of threshold values of the amplifying transistors in each pixel; however the circuit is not necessarily required when the fixed-pattern noise is low.

Thus, in that case, the selecting row needs to read signals only after the transfer pulse, and the reset pulse is not necessarily required.

Next, a second embodiment of the present invention will be explained.

In the second embodiment, the circuit construction and drive pulse are similar to those explained in FIGS. 1, 2 and 4 of the aforementioned embodiment (namely the first embodiment).

One point in which the second embodiment is different from the first embodiment is that, in the second embodiment, the electronic shutter row (namely the second shutter row) always selects the row which is placed right before the selecting row.

Figure 7:
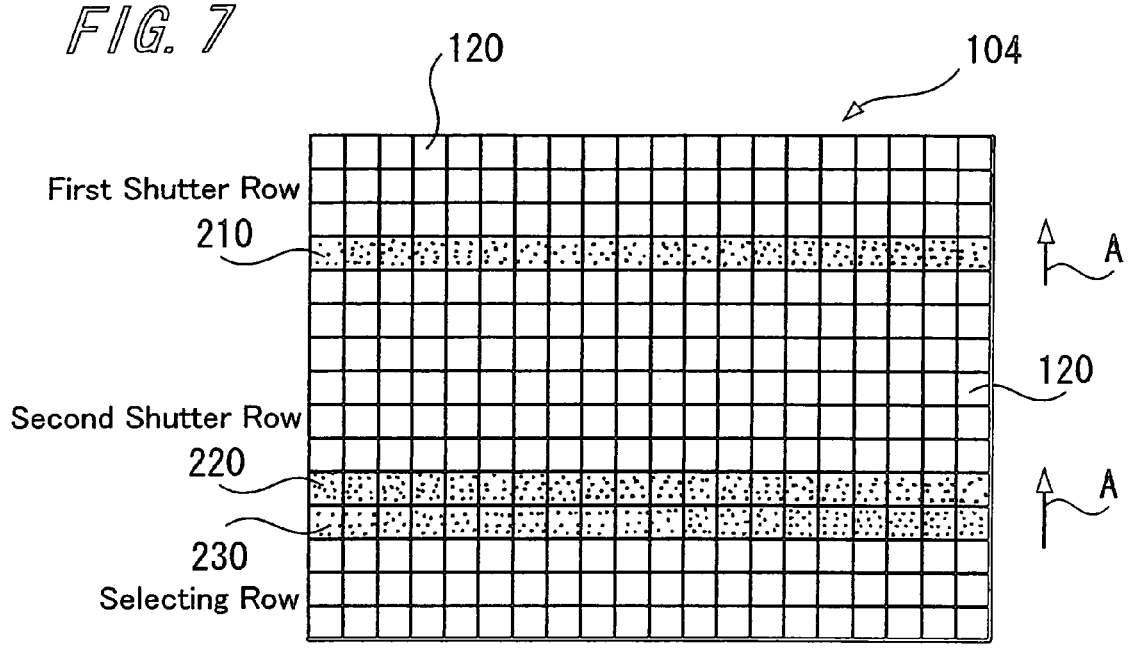
FIG. 7 is a view showing the relationship between electronic shutter rows and a signal readout selecting row of another example of a device according to the present invention.

Specifically, as shown in FIG. 7, the second shutter row 220 and the selecting row 230 are of two consecutive pixel rows in this embodiment.

Further, the signal uptake timing by the CDS circuit is different.

Explained referring to FIG. 4, the signal uptake by the CDS circuit is executed at the timing t10 when the output from the second shutter row is led to the vertical signal line and at the timing t4 when the output from the next row of the selecting row is led to the vertical signal line. The CDS circuit outputs the difference between the above.

In such operation, the reset level of the FD portion first enters the CDS circuit, and then the level of photoelectrons transferred to the FD portion enters. Therefore, the difference represents the net increase of electrons which have been transferred to the FD portion, that is, without containing reset noise.

Accordingly, in the first embodiment the level of photoelectrons enters first, and afterward the reset level thereof enters, so that there remains reset dispersion (reset noise) when the difference is obtained; however, in the second embodiment such influence of reset noise can be removed, thereby improving the picture quality.

Next, a third embodiment of the present invention will be explained.

Figure 8:
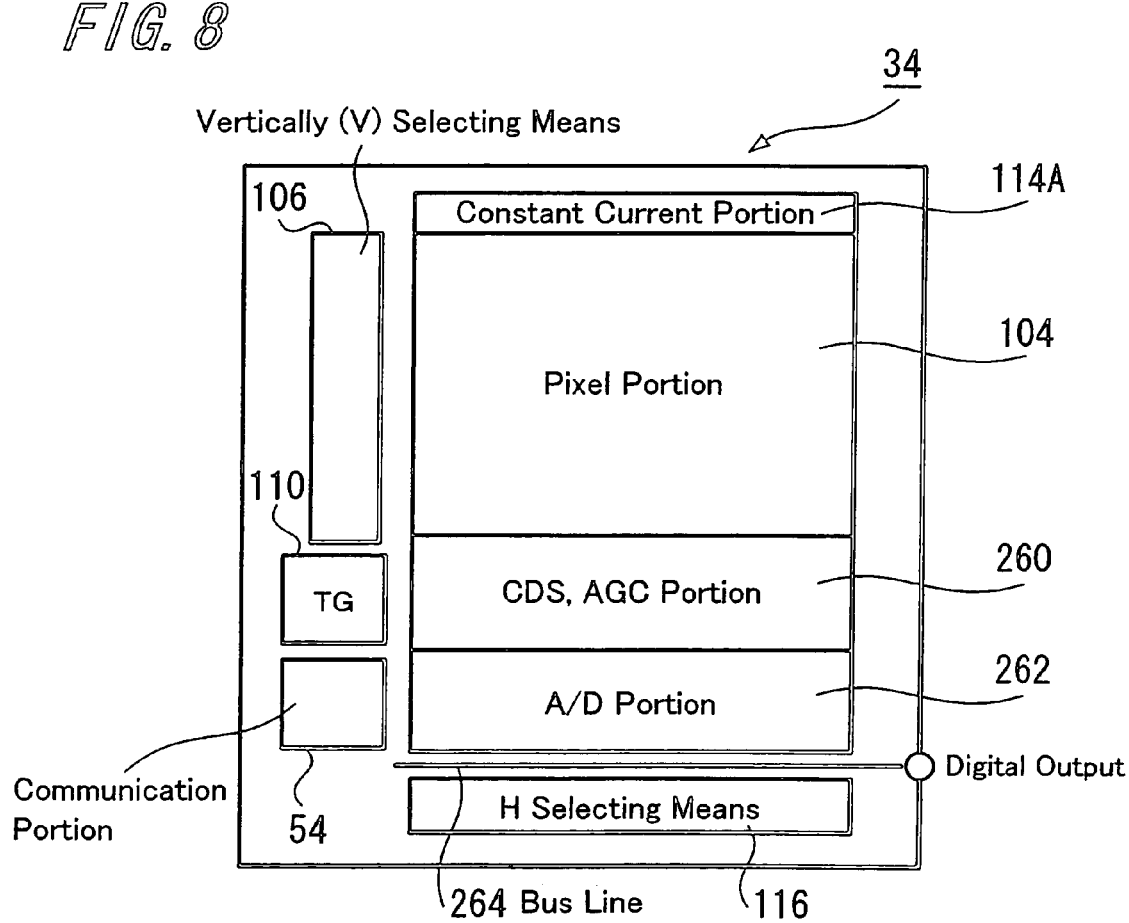
FIG. 8 is an overall constitutional diagram of further another example of a device according to the present invention.

FIG. 8 is a constitutional diagram showing another example of the solid-state imaging device according to the present invention.

A solid-state imaging device 34 shown in FIG. 8 is provided with a communication portion 54 which receives an external signal for controlling a drive mode of the solid-state imaging device 34.

It is possible to select a drive mode which enables the operations of the first and second embodiments mentioned above, using such communication portion 54.

In FIG. 8, the S/H·CDS circuit 146 and the output portion 118 are combined into a CDS·AGC portion 260, and a signal combining·A/D portion 262 which combines signals of the CDS·AGC portion 260, a bus line 264 which outputs the combined signal as a digital output, and the like are shown; however basically this solid-state imaging device is similar to the solid-state imaging device 2 shown in FIG. 1, so that the portions in FIG. 8 which correspond to those in FIG. 1 are given the same reference numerals and are not explained.

Further, with respect to the S/H·CDS circuit 146 explained in each of the aforementioned embodiments, various kinds of modes which have been conventionally used can be employed.

Figure 9:
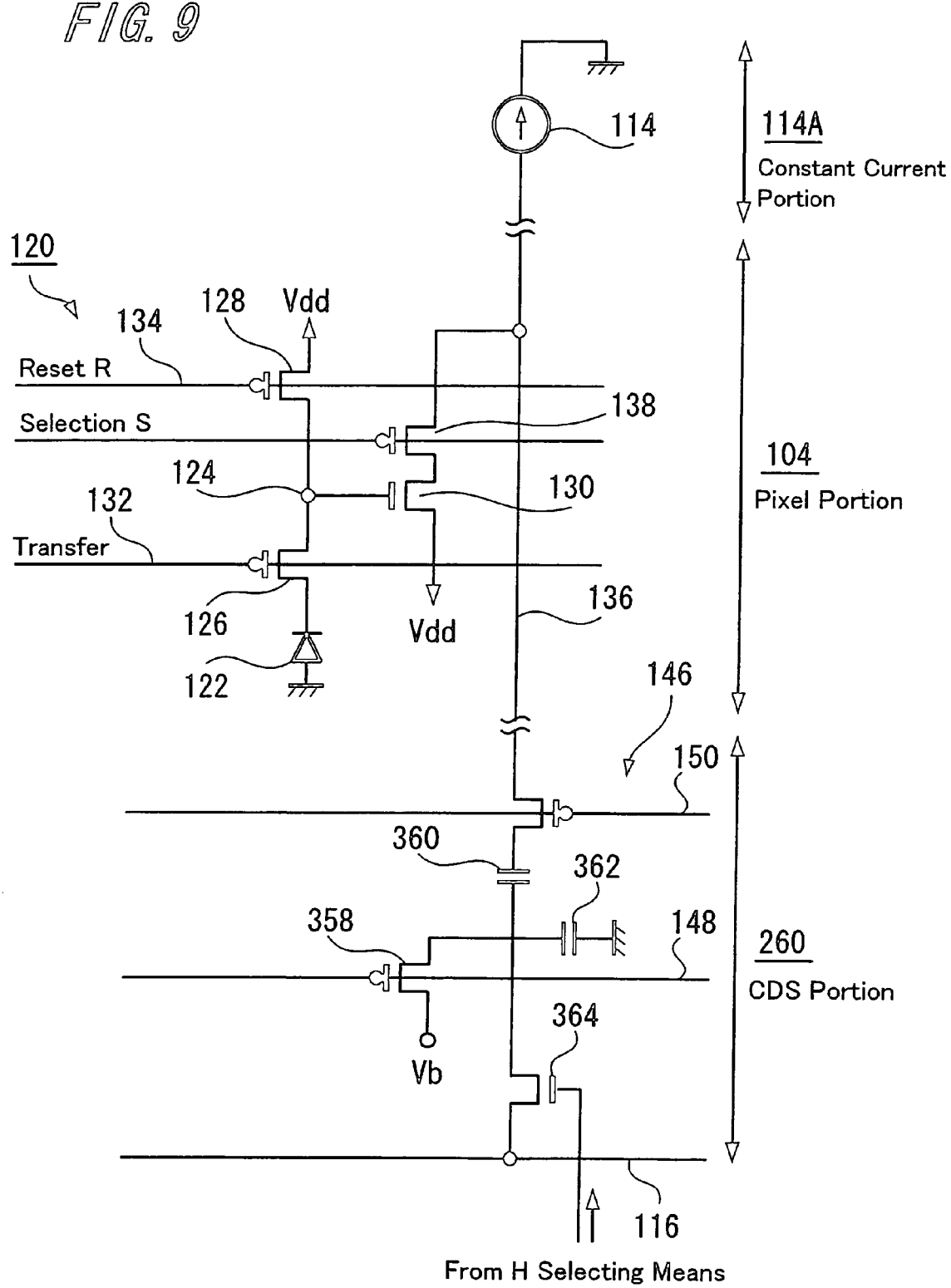
FIG. 9 is a circuit diagram of an example of an S/H·CDS (Sample Hold·Correlated Double Sampling) circuit.
Figure 10:
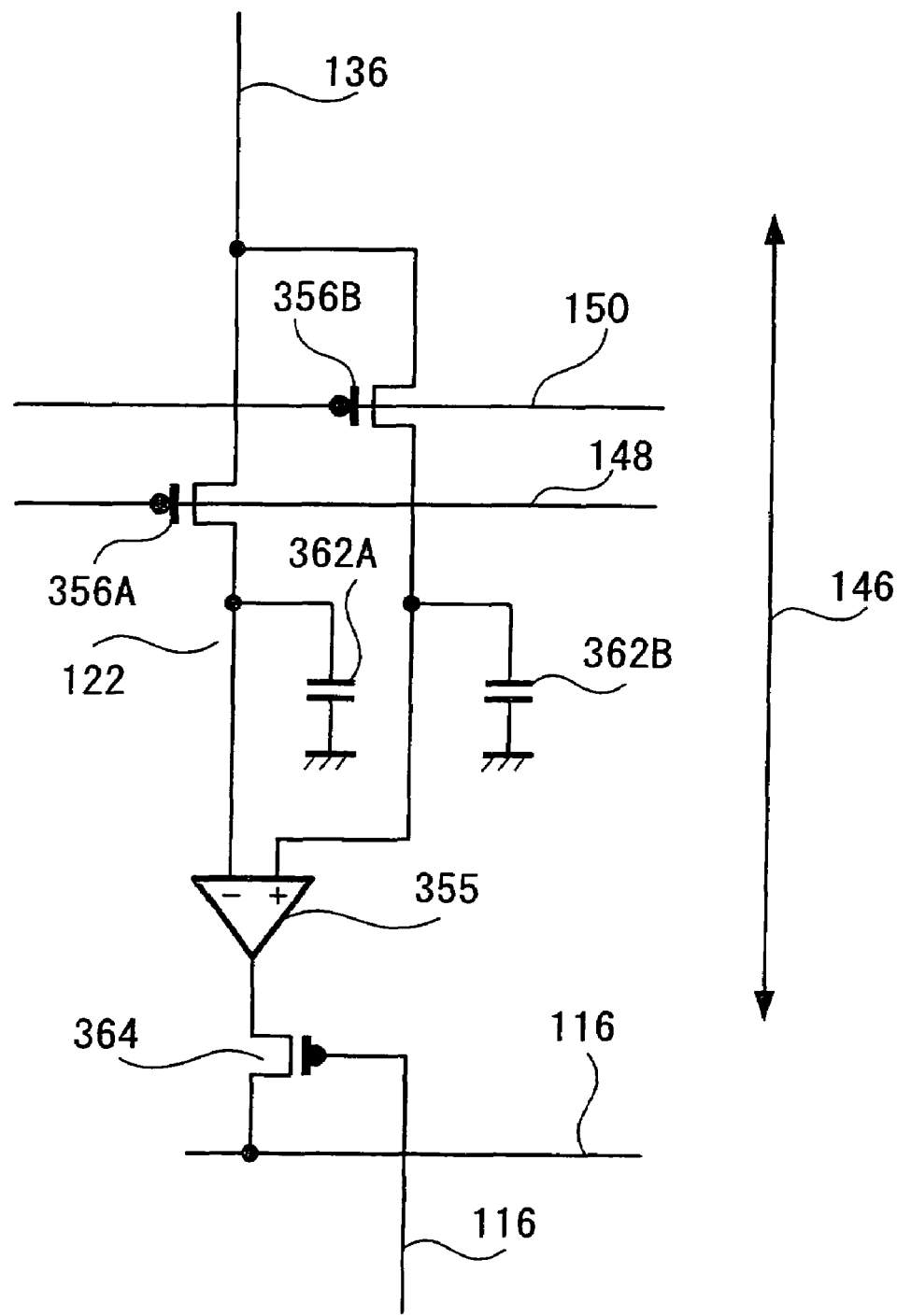
FIG. 10 is a circuit diagram of another example of an S/H·CDS circuit.

For example, FIGS. 9 and 10 are circuit diagrams showing specific examples of the S/H·CDS circuit 146.

FIG. 9 shows a state in which the S/H·CDS circuit 146 is connected to the pixel 120 shown in FIG. 2. This S/H·CDS circuit 146 includes: transistors 356 and 358, condensers (capacitors) 360 and 362, and a horizontally selecting transistor 364.

The drain and the source of the transistor 356 are connected to the vertical signal line 136 and one end of the condenser 360, respectively; and to the gate of the transistor 356 the second sampling pulse 150 is supplied from the timing generator 110.

Also, the drain and the source of the transistor 358 are connected to a bias voltage supply Vb and the other end of the condenser 360, respectively; and to the gate the first sampling pulse 148 is supplied from the timing generator 110.

The condenser 362 is connected between the aforementioned other end of the condenser 360 and the ground, and further, to the aforementioned other end of the condenser 360 the drain of the horizontally selecting transistor 364 is connected.

The source of the horizontally selecting transistor 364 is connected to the horizontal signal line 116, and to the gate a selecting pulse is supplied from the H selecting means 108.

On the other hand, the S/H·CDS circuit 146 shown in FIG. 10 includes: a differential amplifier circuit 355, transistors 356A and 356B, condensers, namely capacitors 362A and 362B, and the horizontally selecting transistor 364. The drains of the transistors 356A and 356B are connected to the vertical signal line 136.

Also, the sources of the transistors 356A and 356B are connected to the input terminal of the differential amplifier circuit 355 and to each of one ends of the condensers 362A and 362B, and to the gates of the transistors 356A and 356B the sampling pulses 148 and 150 are supplied from the timing generator 110.

Also, the output terminal of the differential amplifier circuit 355 is connected to the drain of the horizontally selecting transistor 364, the source of the horizontally selecting transistor 364 is connected to the horizontal signal line 116, and to the gate of the horizontally selecting transistor 364 a selecting pulse is supplied from the H selecting means 108.

It should be noted that these S/H·CDS circuits are examples and S/H·CDS circuits having the construction other than those can also be applied, so that detailed explanation is omitted The present invention can widely be applied to solid-state imaging devices which use various kinds of S/H·CDS circuits as described above.

According to each embodiment of the present invention as described above, it is possible to obtain the following effectiveness:

(1) It is possible to obtain a solid-state imaging device whose dynamic range is wide, using a photodiode whose amount of saturated electric charge is small.

(2) It is possible to output a signal having a knee point, and the sensitivity ratio before and after the knee point can be clearly calculated from the position of the shutter row.

(3) Sensitivity before and after the knee point can be changed separately by adjusting the positions of two shutter rows.

(4) Since an embedded photodiode having low-level noise can be used, it is possible to construct a solid-state imaging device whose S/N is excellent.

(5) Since a new constituent is not required to be added to pixels, the pixels can remain small and the device can be maintained to be small-sized.

(6) Since a longer readout period of time than that of conventional electronic shutters is not required, fast driving can be realized.

(7) There is no need to provide a subsequent circuit which combines signals that have been read in the operation performed a plurality of times, so that circuits remain small in size. Accordingly, fixed-pattern noise due to the dispersion amongst the foregoing circuits does not occur.

The embodiments of the present invention are heretofore described; however the present invention is not limited thereto and various modifications can be applicable.

For example, electrons are made to be carriers in each of the embodiments mentioned above; however, if P-type MOSFETs are used as MOSFETs which construct gates and the like and electron holes are made to be carriers, fundamental operation does not change, so that the similar effectiveness can also be obtained. In addition, although photodiodes are used as photoelectric conversion elements in the above embodiments, it goes without saying that it is possible to use other photoelectric conversion elements such as a photogate.

Furthermore, although a CDS circuit is provided for each pixel row in the above-described embodiments, instead, CDS processing may be executed outside by outputting both signals after the transfer and after the reset: methods of CDS processing do not affect the essence of the present invention.

As described above, according to a solid-state imaging device of the present invention, since a shutter row and a selecting row are sequentially shifted; and in the shutter row, a signal charge of a photoelectric conversion elements is transferred to a floating diffusion portion after the reset of the floating diffusion portion, whereas in the selecting row, a signal charge of the photoelectric conversion element is transferred to the floating diffusion portion at least before the reset of the floating diffusion portion, it is possible to output a signal having a knee point which is sensitive in the dark and insensitive in the light, thereby enabling an excellent image having a wider dynamic range to be obtained even if the amount of saturated electric charges of the photoelectric conversion element is small, with a simple construction having a single output system.

Also, according to a method for driving the solid-state imaging device of the present invention, since shutter and selecting rows are sequentially shifted; and in the shutter row, a signal charge of a photoelectric conversion element is transferred to a floating diffusion portion after the reset of the floating diffusion portion, whereas in the selecting row, a signal charge of the photoelectric conversion element is transferred to the floating diffusion portion at least before the reset of the floating diffusion portion, it is possible to output a signal having a knee point which is sensitive in the dark and insensitive in the light, thereby enabling an excellent image having a wider dynamic range to be obtained even if the amount of saturated electric charges of photoelectric conversion elements is small, with a simple construction having a single output system.

The invention claimed is:

1. A method of manufacturing a solid-state imaging device comprising: forming a plurality of pixels and a vertical selecting means for sequentially selecting rows of the pixels, and forming a signal processing means for performing predetermined signal processing on signals from said pixels, wherein forming each pixel includes: forming a photoelectric conversion element that converts light signals into electrical signals, forming a transfer means for transferring signals from the photoelectric conversion element to a floating diffusion portion, forming a reset means for resetting the electric potential of said floating diffusion portion, and forming an amplifying means for outputting a signal corresponding to the electric potential of said floating diffusion portion; and wherein said signal processing means performs signal processing on said signals from said pixels during a selecting operation but not during a shutter operation, and further wherein when said shuttering operation is performed, signals accumulated in said photoelectric conversion element are transferred to said floating diffusion portion after resetting the electric potential of said floating diffusion portion to a reference potential, and when said selecting operation is performed after said shuttering operation, signals accumulated in said photoelectric conversion element are transferred to the floating diffusion portion without selecting the electric potential of said floating diffusion portion to be the reference potential, or before selecting the electric potential of said floating diffusion portion to be the reference potential, and the reset gate of the pixels remains off after a time when said shuttering operation is performed until said selecting operation is performed.

2. A method of manufacturing a solid-state imaging device according to claim 1, further comprising forming a pixel selecting means that is connected to said amplifying means and outputs signals from said amplifying means to an output signal line.

3. A method of manufacturing a solid-state imaging device according to claim 1, further comprising forming a horizontal selecting means for supplying signals from said signal processing means to a horizontal signal line.

4. A method of manufacturing a solid-state imaging device according to claim 1, wherein forming said signal processing means includes forming at least first and second capacitors.

5. A method of manufacturing a solid-state imaging device according to claim 1, wherein forming said signal processing means includes forming a differential amplifier circuit, and a first capacitor connected to one input terminal of said differential amplifier circuit, and a second capacitor connected to the other input terminal of said differential amplifier circuit.

6. A method of manufacturing a solid-state imaging device comprising: forming an image pixel portion in which a plurality of pixels are arranged in a matrix, and forming a vertical selecting means for vertically selecting each pixel row in said image pixel portion, forming a pixel drive means for driving each pixel in the pixel row selected by said vertical selecting means through pixel drive wiring, and forming a signal processing means for performing predetermined signal processing on pixel data output through an output signal line, wherein forming each pixel in said image pixel portion includes: forming a photoelectric conversion element, a transfer means for transferring a signal charge accumulated by said photoelectric conversion element to a floating diffusion portion, forming a reset means for resetting the electric potential of said floating diffusion portion, and forming an amplifying means for outputting a signal corresponding to the electric potential of said floating diffusion portion;

said vertical selecting means is formed such that it performs the functions of selecting at least two pixel rows in said image pixel portion as a shutter row and a selecting row, and shifting the rows sequentially; and said pixel drive means has the functions of:

in the shutter row selected by said vertical selecting means, performing the operation of transferring a signal charge of said photoelectric conversion element to the floating diffusion portion after the reset of said floating diffusion portion, and, in the selecting row selected by said vertical selecting means, performing the operation of transferring a signal charge of said photoelectric conversion element to the floating diffusion portion without resetting said floating diffusion portion or before resetting said floating diffusion portion, and causing the transferred signals to be output to said signal processing means via said output signal line, wherein said reset gate of the pixels remains off after the pixel is selected as part of a shutter row until a time at which the pixel is selected as part of a selecting row.

7. A method of manufacturing a solid-state imaging device according to claim 6, wherein forming said signal processing means includes forming a Correlated Double Sampling (CDS) circuit; and wherein said pixel drive means is formed such that it resets the floating diffusion portion after the transfer of a signal charge from the photoelectric conversion element to the floating diffusion portion in said selecting row; and said Correlated Double Sampling circuit obtains the difference between the signal charge stored in the floating diffusion portion before the floating diffusion portion is reset and after the floating diffusion portion is reset.

8. A method of manufacturing a solid-state imaging device according to claim 6, wherein forming said signal processing means includes forming a Correlated Double Sampling circuit; and wherein said vertical selecting means is formed such that it selects two consecutive pixel rows as the shutter and selecting rows; and said Correlated Double Sampling circuit identifies a difference between the output signal level in said shutter row after reset of the floating diffusion portion and the output signal level after transfer of the signal charge from the photoelectric conversion element to the floating diffusion portion when the shutter row next becomes the selecting row.

9. A method of manufacturing solid-state imaging device according to claim 6, wherein said vertical selecting means is formed such that it performs the functions of selecting a second shutter row that precedes said shutter row and sequentially shifting the rows, and in the second shutter row performs a reset of said photoelectric conversion element.

* * * * *